United States Patent
Chang

(10) Patent No.: US 9,174,652 B2
(45) Date of Patent: Nov. 3, 2015

(54) SYSTEM AND METHOD FOR REDUCING DRIVING SKILL ATROPHY

(71) Applicant: Honda Motor Co., Ltd., Tokyo (JP)

(72) Inventor: Hsuan Chang, Los Altos, CA (US)

(73) Assignee: Honda Motor Co., Ltd., Tokyo (JP)

( * ) Notice: Subject to any disclaimer, the term of this patent is extended or adjusted under 35 U.S.C. 154(b) by 84 days.

(21) Appl. No.: 14/248,519

(22) Filed: Apr. 9, 2014

(65) Prior Publication Data

US 2014/0222245 A1 Aug. 7, 2014

Related U.S. Application Data

(63) Continuation of application No. 13/032,608, filed on Feb. 22, 2011, now Pat. No. 8,731,736.

(51) Int. Cl.
*B60W 50/00* (2006.01)
*B60W 50/08* (2012.01)
*B60W 50/14* (2012.01)

(52) U.S. Cl.
CPC ............... *B60W 50/08* (2013.01); *B60W 50/14* (2013.01); *B60W 2050/0089* (2013.01); *B60W 2050/146* (2013.01); *B60W 2540/30* (2013.01)

(58) Field of Classification Search
None
See application file for complete search history.

(56) References Cited

U.S. PATENT DOCUMENTS

| | | | |
|---|---|---|---|
| 4,359,725 A | 11/1982 | Balogh et al. | |
| 4,876,594 A | 10/1989 | Schiffman | |
| 5,172,785 A * | 12/1992 | Takahashi | B60K 28/06 180/271 |
| 5,546,305 A * | 8/1996 | Kondo | G07C 5/0841 340/439 |
| 5,682,882 A | 11/1997 | Lieberman | |
| 5,694,116 A | 12/1997 | Kojima | |
| 5,717,591 A * | 2/1998 | Okada | B60T 8/1755 180/197 |
| 5,798,695 A | 8/1998 | Metalis et al. | |
| 5,991,675 A * | 11/1999 | Asanuma | B60G 17/0195 180/422 |
| 6,317,666 B1 | 11/2001 | List et al. | |
| 6,353,396 B1 | 3/2002 | Atlas | |

(Continued)

FOREIGN PATENT DOCUMENTS

| | | |
|---|---|---|
| EP | 1 326 759 | 11/2006 |
| EP | 1 395 176 | 10/2008 |

(Continued)

OTHER PUBLICATIONS

Bergasa, L. et al., "Real-Time System for Monitoring Driver Vigilance," *IEEE Transactions on Intelligent Transportation Systems*, Mar. 2006, pp. 63-77, vol. 7, No. 1.

(Continued)

*Primary Examiner* — Jonathan M Dager
(74) *Attorney, Agent, or Firm* — Rankin, Hill & Clark LLP

(57) ABSTRACT

A system for preventing driving skill atrophy comprises a trainer module that determines the driver's current skill level, disables certain automated features based on the determined skill level, and forces the driver to use and hone her driving skills. The system collects data to determine through onboard vehicle sensors how a driver is driving the vehicle. The system then compares the driver's current driving skills with the driver's historical driving skills or the general population's driving skills. Based on the comparison, the system determines whether the driver's skill level is stagnant, improving or deteriorating. If the skill level is improving, for example, the system disables certain automated driving features to give driver more control of the vehicle.

19 Claims, 4 Drawing Sheets

(56) References Cited

U.S. PATENT DOCUMENTS

| | | | |
|---|---|---|---|
| 6,496,724 B1 | 12/2002 | Levendowski et al. | |
| 6,575,902 B1 | 6/2003 | Burton | |
| 6,927,694 B1 | 8/2005 | Smith et al. | |
| 6,974,414 B2 | 12/2005 | Victor | |
| 7,292,152 B2* | 11/2007 | Torkkola | G08B 21/06 340/426.2 |
| 7,389,178 B2* | 6/2008 | Raz | G07C 5/085 340/903 |
| 7,427,924 B2 | 9/2008 | Ferrone et al. | |
| 7,444,311 B2* | 10/2008 | Engstrom | B60K 41/004 706/20 |
| 7,454,962 B2 | 11/2008 | Nishiyama et al. | |
| 7,649,445 B2 | 1/2010 | Kuramori et al. | |
| 7,765,058 B2* | 7/2010 | Doering | B60R 16/0236 340/425.5 |
| 7,769,499 B2* | 8/2010 | McQuade | G07C 5/008 701/1 |
| 7,809,487 B2* | 10/2010 | Syed | B60T 8/174 701/70 |
| 8,024,085 B2* | 9/2011 | Yamagata | A61B 5/02055 180/272 |
| 8,031,063 B2* | 10/2011 | Schmitz | B60K 31/047 340/439 |
| 8,068,953 B2* | 11/2011 | Sakuma | B60W 40/09 180/443 |
| 8,135,507 B2* | 3/2012 | Okabe | A61B 5/165 180/272 |
| 8,155,868 B1* | 4/2012 | Xing | G07C 5/0808 340/439 |
| 8,170,725 B2 | 5/2012 | Chin et al. | |
| 8,175,772 B2* | 5/2012 | Onuma | B62D 6/007 180/402 |
| 8,280,601 B2 | 10/2012 | Huang et al. | |
| 8,290,697 B2* | 10/2012 | Coughlin | B60W 40/09 345/157 |
| 8,576,062 B2* | 11/2013 | Yamaoka | B60W 50/0098 340/439 |
| 8,958,975 B2* | 2/2015 | Savaresi | B60W 40/09 701/1 |
| 9,086,297 B2* | 7/2015 | Haleem | G01C 21/3697 |
| 9,090,261 B2* | 7/2015 | Kitagishi | B60W 50/0098 |
| 2002/0120374 A1* | 8/2002 | Douros | G09B 9/052 701/34.4 |
| 2002/0151297 A1* | 10/2002 | Remboski | B60R 16/0231 455/414.1 |
| 2003/0130031 A1* | 7/2003 | Yoshida | A63F 13/10 463/23 |
| 2004/0044293 A1 | 3/2004 | Burton | |
| 2004/0236474 A1* | 11/2004 | Chowdhary | G06Q 30/0601 701/1 |
| 2004/0249533 A1* | 12/2004 | Wheals | B60T 8/172 701/36 |
| 2005/0027423 A1* | 2/2005 | Minami | G01F 9/023 701/51 |
| 2005/0137757 A1* | 6/2005 | Phelan | G01M 17/00 701/1 |
| 2006/0053038 A1* | 3/2006 | Warren | G06Q 40/08 705/4 |
| 2006/0212195 A1* | 9/2006 | Veith | G06Q 10/06 701/33.4 |
| 2007/0001831 A1* | 1/2007 | Raz | B60R 16/0231 340/439 |
| 2007/0050127 A1 | 3/2007 | Kellum et al. | |
| 2007/0080816 A1 | 4/2007 | Hague et al. | |
| 2007/0120691 A1 | 5/2007 | Braun | |
| 2007/0124332 A1* | 5/2007 | Ballesty | B61L 27/0094 1/1 |
| 2007/0136078 A1* | 6/2007 | Plante | G06Q 10/00 348/148 |
| 2007/0145819 A1* | 6/2007 | Lin | B60T 8/172 303/146 |
| 2007/0173994 A1* | 7/2007 | Kubo | G07C 5/0858 701/32.4 |
| 2007/0213886 A1* | 9/2007 | Zhang | B60W 40/09 701/1 |
| 2007/0257815 A1* | 11/2007 | Gunderson | G08G 1/20 340/903 |
| 2007/0268158 A1* | 11/2007 | Gunderson | G06Q 40/08 340/933 |
| 2007/0271105 A1* | 11/2007 | Gunderson | G06Q 10/087 705/1.1 |
| 2007/0290867 A1* | 12/2007 | Kuramori | B60Q 9/00 340/576 |
| 2008/0105482 A1* | 5/2008 | Yamaguchi | G05B 15/02 180/271 |
| 2008/0133121 A1* | 6/2008 | Sato | F02D 41/00 701/123 |
| 2008/0167775 A1* | 7/2008 | Kuttenberger | B60R 21/01542 701/36 |
| 2009/0040054 A1 | 2/2009 | Wang et al. | |
| 2009/0182460 A1* | 7/2009 | O'Neal | G08C 17/00 701/2 |
| 2010/0023223 A1* | 1/2010 | Huang | B60W 40/09 701/44 |
| 2010/0055649 A1* | 3/2010 | Takahashi | B60W 30/00 434/66 |
| 2010/0113203 A1 | 5/2010 | Larkin | |
| 2010/0191411 A1* | 7/2010 | Cook | G07C 5/085 701/31.4 |
| 2010/0209881 A1 | 8/2010 | Lin et al. | |
| 2010/0209883 A1* | 8/2010 | Chin | G09B 19/167 434/65 |
| 2010/0209885 A1* | 8/2010 | Chin | G09B 19/167 434/65 |
| 2010/0209888 A1* | 8/2010 | Huang | B60W 40/09 434/65 |
| 2010/0209889 A1* | 8/2010 | Huang | B60W 40/09 434/65 |
| 2010/0209890 A1* | 8/2010 | Huang | G09B 19/167 434/65 |
| 2010/0209891 A1* | 8/2010 | Lin | G09B 19/167 434/66 |
| 2010/0209892 A1* | 8/2010 | Lin | G09B 19/167 434/71 |
| 2010/0211270 A1* | 8/2010 | Chin | B62D 6/007 701/44 |
| 2010/0238009 A1* | 9/2010 | Cook | G06Q 10/10 340/439 |
| 2011/0040447 A1* | 2/2011 | Horiuchi | B62D 6/007 701/41 |
| 2011/0077028 A1* | 3/2011 | Wilkes, III | B60W 50/14 455/456.3 |
| 2011/0251752 A1* | 10/2011 | DeLarocheliere et al. | G07C 5/008 701/31.4 |
| 2012/0083947 A1* | 4/2012 | Anderson | B60W 30/09 701/3 |
| 2012/0215375 A1* | 8/2012 | Chang | B60W 50/14 701/1 |
| 2012/0303254 A1* | 11/2012 | Kirsch | G07C 5/0808 701/123 |
| 2013/0345927 A1* | 12/2013 | Cook | G07C 5/085 701/33.4 |
| 2014/0032062 A1* | 1/2014 | Baer | G01C 21/3469 701/51 |
| 2014/0210625 A1* | 7/2014 | Nemat-Nasser | B60K 28/066 340/575 |
| 2014/0272811 A1* | 9/2014 | Palan | G07C 5/008 434/66 |

FOREIGN PATENT DOCUMENTS

| | | |
|---|---|---|
| EP | 1 990 259 | 11/2008 |
| EP | 2 161 641 | 3/2010 |
| WO | WO 2004/028362 | 4/2004 |
| WO | WO 2007/090896 | 8/2007 |
| WO | WO 2008/001125 | 1/2008 |

OTHER PUBLICATIONS

Boverie, S., "Driver Fatigue Monitoring Technologies and Future Ideas," *Road Safety Workshop 2004*, Sep. 29, 2004, twelve pages, Balocco, Italy.

(56) References Cited

OTHER PUBLICATIONS

Daimler AG, "Don't Fall Asleep: Assistance System Can Provide Early Warning of Detected Fatigue," Feb. 2008, pp. 46-51.

Ji, Q. et al., "Real-Time Eye, Gaze, and Face Pose Tracking for Monitoring Driver Vigilance," *Real-Time Imaging*, 2002, pp. 357-377.

Ma, H. et al., "A Fast Method for Monitoring Driver Fatigue Using Monocular Camera," *Proceedings of the 11th Joint Conference on Information Sciences*, 2008, four pages.

PCT International Search Report and Written Opinion, PCT Application No. PCT/US2012/026030, May 25, 2012, twelve pages.

Polychronopoulos, A. et al., "Definition of AWAKE Functions, Scenarios and Sensors to Be Used. System Architecture and Risk Analysis," Oct. 11, 2004, one-hundred two pages.

Spaans, M.A. et al., "Facial Recognition System for Driver Vigilance Monitoring," Jun. 2003, Czech Technical University in Prague.

United States Office Action, U.S. Appl. No. 13/032,608, Jun. 20, 2013, nine pages.

United States Office Action, U.S. Appl. No. 13/032,608, Jan. 8, 2014, eleven pages.

Wheldon, R., "Rail Safety and Standards Board's (RSSB) Response to the 2002 Report by Quintec Entitled 'Driver Vigilance Devices: Systems Review'," Date Unknown, 105 pages.

Zer Customs, "Mercedes Attention Assist," Mar. 2, 2009, two pages. [Online] [Retrieved Mar. 1, 2009] Retrieved from the Internet <URL:http://www.zercustoms.com/news/Mercedes-Attention-Assist.html.>.

\* cited by examiner

SYSTEM AND METHOD FOR REDUCING DRIVING SKILL ATROPHY

CROSS REFERENCE TO RELATED APPLICATIONS

This application is a continuation of U.S. application Ser. No. 13/032,608, filed Feb. 22, 2011, the contents of which are incorporated by reference in their entirety.

BACKGROUND

1. Field of Disclosure

The disclosure generally relates to driver and vehicle safety, in particular to reducing driving skill atrophy.

2. Description of the Related Art

Vehicles today include automated features, like automated parallel parking, anti-lock brakes, active cruise control, etc., that enable the driver to relinquish driving control to the vehicle. While such features are helpful for a driver, excessive reliance on such features result in deteriorated driving skills. Accordingly, vehicles today may provide convenience to the driver in short term, but impair the driver's skills in long term. The contemporary vehicles need to better understand the driver and form a harmonious relationship with the driver such that the driver better understands how to handle the vehicle.

SUMMARY

Embodiments of the invention prevent deterioration of a driver's skill by determining the driver's current skill level, disabling certain automated features based on the determined skill level, and forcing the driver to use and hone her driving skills. The system collects data to determine through on-board vehicle sensors how a driver is driving the vehicle. The system then compares the driver's current driving skills with the driver's historical driving skills or the general population's driving skills. Based on the comparison, the system determines whether the driver's skill level is stagnant, improving or deteriorating. If the skill level is improving, for example, the system disables certain automated driving features to give driver more control of the vehicle. In one embodiment, additional information such as weather conditions is also used to assist in determining whether any automated driving features are disabled. Because the driver does not have the support of the disabled automated features, the driver is forced to hone her own driving skills to perform the function support by the disabled automated feature.

Other embodiments of the invention include computer-readable medium that store instructions for implementing the above described functions of the system, and computer-implemented method that includes steps for performing the above described functions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The computing environment described herein enables prevention of driving skill atrophy. The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
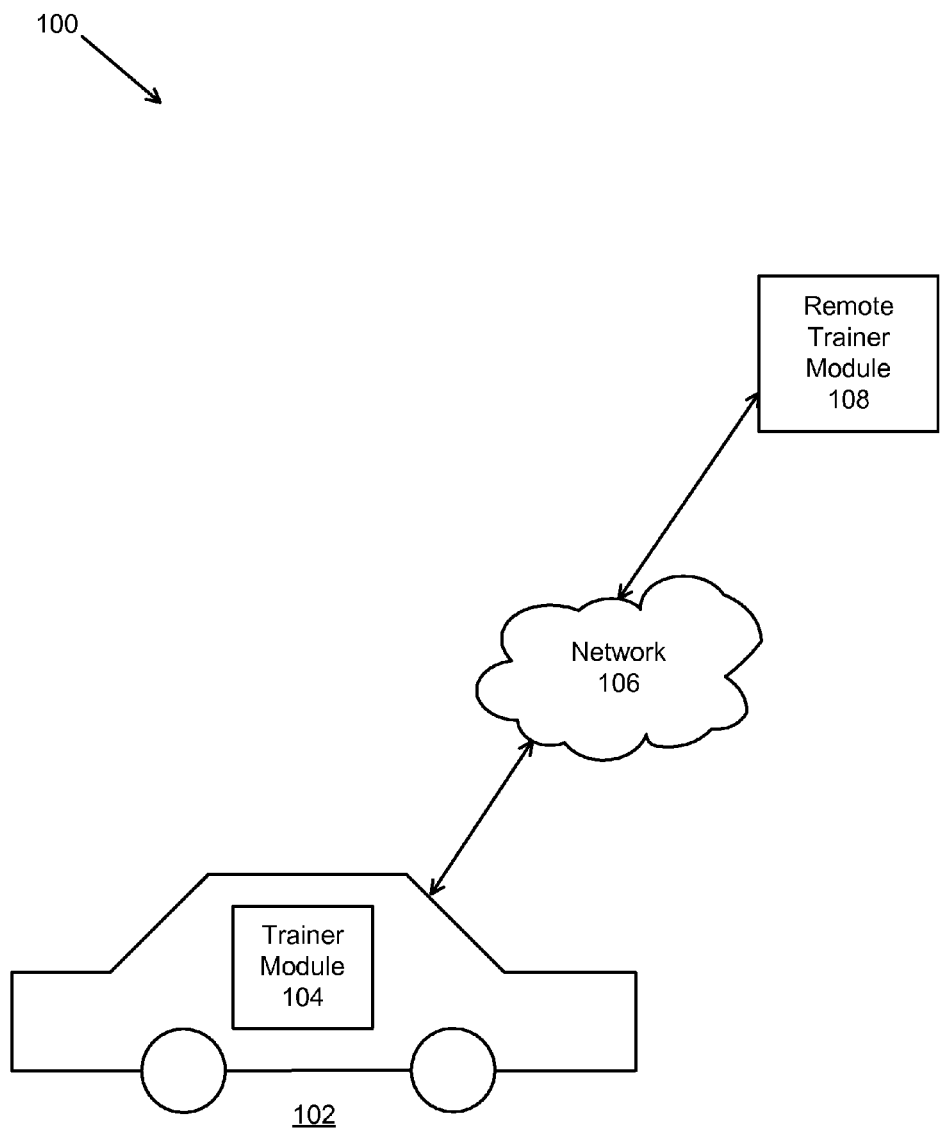
FIG. 1 is a block diagram illustrating a computing environment for preventing driving skill atrophy according to one embodiment.

Referring to FIG. 1, the computing environment 100 for preventing driving skill atrophy comprises a vehicle 102 including a trainer module 104, a network 106 and a remote trainer module 108. The remote trainer module 108 is a computing device comprising a processor and a memory capable of receiving and storing various drivers' information from trainer module 104, determining road conditions for roads being traversed by various vehicles 102, and transmitting the determined information to trainer module 104. The transmitted information helps the trainer module 104 determine the driver's current skill level based on current road conditions, the driver's historical driving skill levels, and/or general population's skill levels. Examples of such driver's information include a particular driver's identification, parameters describing the driver's vehicle 102 (hereinafter "vehicle parameters"), roads driven by the driver (hereinafter "road parameters"), driver's most recent operation of the vehicle (hereinafter "current operation parameters"), environmental conditions during the most recent operation (hereinafter "current environmental parameters"), driver's previous operations of the vehicle excluding the most recent operation (hereinafter "historical operation parameters"), environmental conditions during the previous operations (hereinafter "historical environmental parameters"), driver's current physiological parameters associated with the driver's most recent vehicle operation, and driver's historical physiological parameters associated with historical vehicle operations.

Vehicle parameters include parameters describing the vehicle's make, model, maximum speed, stopping distance and time, weight, physical dimensions, acceleration rates, and supported automated features. The remote trainer module 108 receives the vehicle parameters from trainer module 104 or another module associated with the vehicle manufacturer. Examples of road parameters include parameters describing average speed of vehicles on the road at various times of the day, and road conditions like wet or snowy road at a particular time, traffic signs, pot holes, curves, lanes, and traffic lights present on the road. The remote trainer module 108 receives such road parameters from an external database that maintains such information about the roads in a given geographical region. Examples of environmental parameters include weather information like rain or snow for a particular time associated with a particular road or geographical location. The remote trainer module 108 receives such environmental parameters from an external database that maintains such information about the weather in a given geographical region.

Current operation parameters include parameters describing the average speed the driver drives the vehicle, frequency or rate at which the driver accelerates the vehicle, driver's steering movement or change in steering angle, rate at which the driver employs brakes, driver's reaction time to an approaching object like a stop sign, rate at which the driver changes lanes on various roads, continuous distance driven by the driver, average amount of pressure the driver employs in gripping the steering, and turning angles employed by the driver in taking various turns. The remote trainer module 108 receives such operation parameters from trainer module 104. In one embodiment, the remote trainer module 108 also receives from trainer module 104, information about the driver's location at which the current parameters were recorded. The remote trainer module 108 uses the received location information to determine and associate road parameters and environmental parameters with the received current operation parameters.

Current physiological parameters include parameters describing the driver's internal and/or external physiological state. Examples of parameters describing internal physiological state include parameters describing driver's brain activity, like Electroencephalography (EEG) parameters; parameters describing the driver's muscle activity, like Electromyography (EMG) parameters; parameters describing the driver's heart activity, like Electrocardiography (ECG) parameters; parameters describing driver's respiratory patterns, and parameters describing the driver's core temperature. Examples of parameters describing external physiological state include parameters describing the driver's facial expressions, facial temperature, frequency of head movement, head position, head orientation, eye movement, eye-gaze direction, blink rate, and retinal size. Such parameters are recorded by various devices like camera and sensors in vehicle 102. The trainer module 104 receives the recorded measurements and transmits them to remote trainer module 108. In one embodiment, the remote trainer module 108 also receives from trainer module 104, information about the driver's location at which the current parameters were recorded. The remote trainer module 108 uses the received location information to determine and associate road parameters and environmental parameters with the received current physiological parameters.

The remote trainer module 108 repeatedly receives the driver's current operation parameters, current physiological parameters, and associated road information. As new information is received, the remote trainer module 108 stores previously received information as historical operation parameters and historical physiological parameters along with the associated road parameters.

Additionally, the remote trainer module 108 receives information about various drivers from various trainer modules 104 present in the drivers' vehicles 102. Based on this received information, the remote trainer module 108 determines parameters associated with an average driver (e.g., a driver with average driving skills) in general population, general population in driver's geographical location, or general population that shares certain common traits with the driver like gender, age, vehicle's make and model, or similar road parameters (e.g., an average driver driving on similar roads as the current driver). In this manner, the remote trainer module 108 stores information that is partly or wholly used by the trainer module 104 to determine a driver's skill level. The remote trainer module 108 transmits part or all of this stored information through network 106.

The Network 106 represents the communication pathways between the trainer module 104 and remote trainer module 108. In one embodiment, the network 106 links to trainer module 104 through a wireless protocol. Additionally, in one embodiment, the network 106 is the Internet. The network 106 can also use dedicated or private communication links that are not necessarily part of the Internet. In one embodiment, the network 106 is a cellular network comprised of multiple base stations, controllers, and a core network that typically includes multiple switching entities and gateways. In one embodiment, the wireless communication network 106 is a wireless local area network (WLAN) that provides wireless communication over a limited area. In one embodiment, the WLAN includes an access point that connects the WLAN to the Internet.

The trainer module 104 is a computing device with a processor and a memory capable of receiving information from remote trainer module 108, determining the driver's current skill level based on the received information, and enabling or disabling one or more automated features in vehicle 102 to help improve the driver's skill. For example, the trainer module 104 disables an automated feature if the trainer module 104 determines that the driver has improved her driving skills. The disabled feature beneficially forces the driver to use and hone her own driving skill supported by the disabled driving feature. Similarly, the trainer module 104 enables an automated feature if the trainer module 104 determines that the driver's skills have deteriorated. In one embodiment, the enabled feature provides temporary support to the driver if the trainer module 104 determines that the driver's skills are inadequate to handle a particular driving task without the feature's support. The trainer module 104 is described further below in reference to FIG. 2.

Trainer Module

Figure 2:
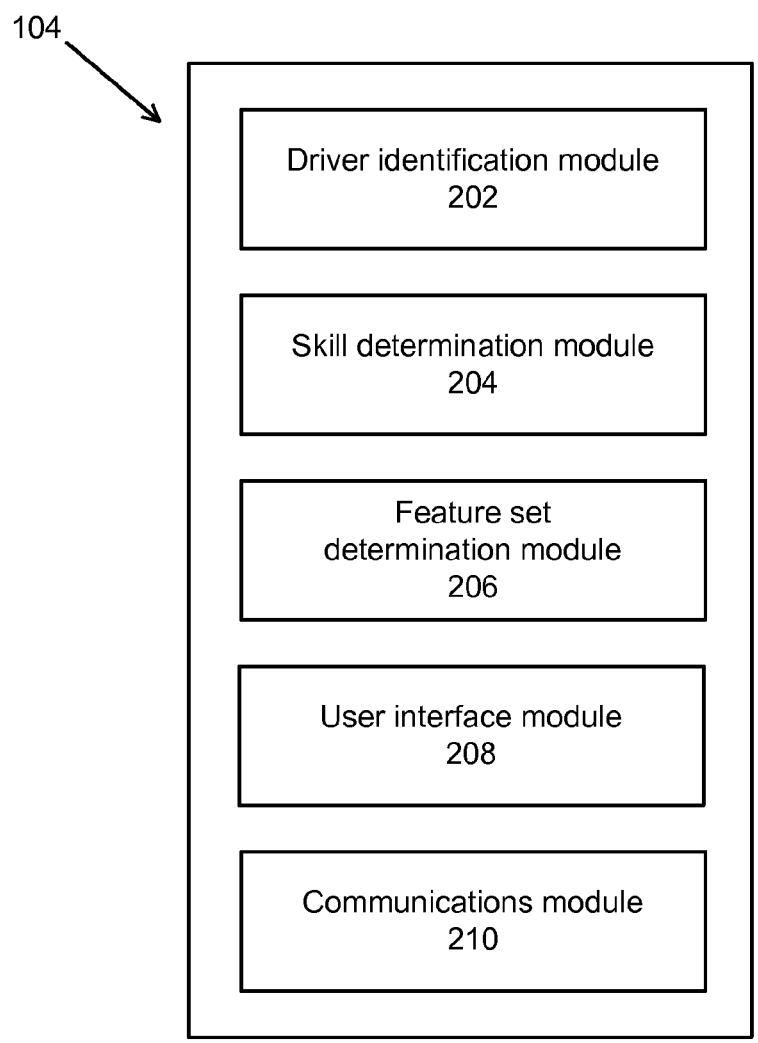
FIG. 2 is a block diagram illustrating a trainer module according to one embodiment.

FIG. 2 is a block diagram illustrating a trainer module according to one embodiment. The trainer module 104 comprises a driver identification module 202, a skill determination module 204, a feature set determination module 206, a user interface module 208, and a communications module 210.

The driver identification module 202 identifies the driver of vehicle 102 using stored identification information about previous drivers that have driven the vehicle. For example, in one embodiment, a keypad or another input device receives an identification from the driver and transmits the identification to the identification module 202. In another embodiment, a key fob is used to identify the driver. Alternatively or in combination with other techniques, a weight sensor module located in the driver's seat, or another part of the vehicle, measures the driver's weight after the driver sits down in the vehicle. The weight sensor module transmits the determined weight to the driver identification module 202 to assist in identifying the driver based upon previous weight measurements for various drivers of the vehicle. In other embodiments, a fingerprint identification device scans a driver's finger or a retinal scan device scans a driver's eye. The devices then transmit the scans to the driver identification module 102. The identification module 202 receives the driver's identification, weight, and/or scan, and compares the received parameter(s) with the previously stored parameters. If a match is found, the driver identification module 202 identifies the driver as one of the previous drivers who had previously driven the vehicle. Otherwise, if no match is found, the driver identification module 202 determines that a new driver has entered the vehicle 102, the driver identification module 202 assigns an identification to the driver, and stores the received driver's parameter(s). The driver identification module 202 then transmits the determined identification to the skill determination module 204.

The skill determination module 204 receives the driver's identification and determines the driver's initial skill level corresponding to the received identification. The skill determination module 204 transmits this initial skill level to the feature set determination module 206 that determines a feature set to be enable for the driver based on the received initial skill level. The skill determination module 204 then monitors the driver and determines a current skill level for the driver. The current skill level is used by the feature set determination module 206 to alter the feature set enabled by vehicle 102 for the driver.

To determine the initial skill level, in one embodiment, the skill determination module 204 stores a current skill level score for the identified driver based on the driver's previous use of the vehicle 102. The skill determination module 204 retrieves this stored level and marks this retrieved skill level as an initial skill level. If the skill determination module 204 receives an identification for a new driver, the remote trainer module 108 or the trainer module 104 does not have any parameters for such a driver. In this case, the skill determination module 204 assigns a minimum skill level as the initial skill level for the new driver. In another embodiment, the skill determination module 204 measures the operation parameters and/or physiological parameters for the new driver for a pre-determined amount of time or pre-determined amount of driven miles. The skill determination module 204 then retrieves from remote trainer module 108 similar parameters for an average driver in general population or general population that shares certain common traits with the driver like gender, age, geographical location, or vehicle parameters. The skill determination module 204 then compares the driver's measured parameters with the retrieved parameters of the average driver. Additionally, in one embodiment, the skill determination module 204 determines the road parameters and/or environmental parameters for the driver. The skill determination module 204 retrieves from remote trainer module 108 similar parameters for an average driver that has road and/or environmental parameters similar to the driver. The skill determination module 204 then compares the driver's operations and/or physiological parameters with parameters of the average driver.

Based on the comparison, the skill determination module 204 determines an initial skill level for the new driver. In one embodiment, the skill level is represented as a score ranging between a minimum and maximum number. In another embodiment, the skill determination module 204 determines driver's initial skill level in various categories like driver's turning capabilities, handling of the vehicle, breaking time etc. The skill determination module 204 may provide a score in each of these categories.

Next, the skill determination module 204 monitors the driver for a predetermined amount of time or amount of driven distance. During this monitoring, the skill determination module 204 measures the operation parameters and physiological parameters for the driver as the driver operates the vehicle. The skill determination module 204 then compares the measured parameters with the parameters of an average driver in the general population or those in the general population that share certain common traits with the driver like gender, age, geographical location, or vehicle parameters. In another embodiment, the skill determination module 204 compares the measured parameters with historical parameters for the driver. Additionally, in one embodiment, the skill determination module 204 determines the road parameters and/or environmental parameters for the driver and compares the driver's operations and/or physiological parameters with driver's historical parameters or parameters of other drivers when they drove with similar environmental and/or road parameters.

Based on the comparison, the skill determination module 204 determines a current skill level for the driver. The skill determination module 204 then stores the current skill level and later uses the stored level as the initial skill level when the driver next drives the car. Additionally, the skill determination module 204 transmits the measured parameters and determined current skill level to the remote trainer module 108. The skill determination module 204 also transmits the current skill level to feature set determination module 206.

The feature set determination module 206 receives the initial and current skill levels and determines a feature set for the driver based on the received skill levels. In one embodiment, the received skill levels are represented as a score and the feature set determination module 206 stores features sets corresponding to different scores. Additionally, the feature set determination module 206 stores a minimum acceptable skill level. The feature set determination module 206 initially determines if the received initial skill level is above the minimum acceptable level. If not, the feature set determination module 206 takes appropriate actions like restricting the vehicle's speed to a maximum speed or communicating a visual or audible warning to the driver. If the received initial skill level is above the minimum acceptable level, the feature set determination module 206 determines the corresponding features for the initial skill level and enables the corresponding features. The feature set determination module 206 does not enable additional features that may be available for a lower skill level.

In another embodiment, the received skill levels are a collection of scores in various categories. In this embodiment, the feature set determination module 206 analyzes the scores in different categories and enables or disables features based on this analysis. For example, if the received initial skill levels are low for turning and braking distance, the feature set determination module 206 enables the automated parallel parking feature. A combined score representing the driver's skill level does not provide this advantage as a high score in one particular category may compensate a low score in another category when a combined score is determined. The combined score therefore may hide the driver's weak skills in a particular category and may not adequately represent the driver's skill in that category. The individual scores in different categories, however, beneficially indicate the driver's skill in particular categories. Such individual scores enable the feature set determination module 206 to select feature sets better suited to improving a driver's skill. The skill determination module 206 is not restricted to enabling a fixed set of features corresponding to a combined score representing the driver's skill level. Instead the feature set determination module 206 may select a feature set tailor-made to the driver's skill level in different driving skill categories.

After enabling features based on the received initial skill level, the feature set determination module 206 receives the driver's current skill level. The feature set determination module 206 then determines if the received current skill level is different (e.g., improved or deteriorated) from the initial skill level. If yes, the feature set determination module 206 alters the enabled feature set based on the change in skill level. In one embodiment, the feature set determination module 206 first determines if it's safe to alter the feature set before doing so. For example, the feature set determination module 206 may not change the feature set if the driver is currently driving the vehicle 102 above a threshold speed level.

After changing the feature set, the feature set determination module 206 informs the driver through an audible and/or visual indicator regarding the changed feature set and skill level.

In this manner, the feature set determination module 206 beneficially alters the enabled feature set for a particular driver. As the driver's skills improve, the feature set determination module 206 disables additional features and forces the driver to rely on and hone her own driving skills instead of depending on the automated features. Accordingly, the driver does not become excessively dependent on the automated features in the vehicle 102.

Additionally, the feature set determination module 206 beneficially uses the change in driver's skill, instead of driver's physiological state, to alter the supported features for a driver. Physiological state alone may not be a good proxy of driver's skill. For example, frequent braking in a crowded area may cause stressful changes in driver's physiological state. However, such stress alone does not indicate bad driving skills. It's possible that the road parameters and environment parameters indicate that drivers with good driving skills frequently apply brakes in similar situations. Accordingly, a stressed driver in a particular situation may still apply good driving skills even while stressed and therefore physiological state alone is not a good proxy for driving skills. The feature set determination module 206 therefore alters the feature set based on change in driver's skill and not physiological state alone.

The user interface module 208 provides an interface between the trainer module 104 and the driver. The user interface module 208 therefore receives a request from other modules to communicate information to the driver. For example, the feature set determination module 206 transmits a signal to user interface module 208 requesting that the interface module 208 display a warning or the currently enabled feature set to the driver. In turn, the user interface module 208 displays the warning or the feature set to the driver. As driver's skills improve, more features are disabled and the driver relies more on her driving ability. In one embodiment, the user interface module 208 displays a graphical element, like the one illustrated in FIG. 4B, that informs the driver about the amount of driver's reliance on her own skills. Referring to FIG. 4B, if the displayed needle points to E, the element indicates to the driver that all the automated features are enabled and the driver's reliance on her own skills is minimal. On the other hand, if the displayed needle points to F, the driver knows that all the automated features are currently disabled and the driver is completely relying on her own skills.

Figure 4A:
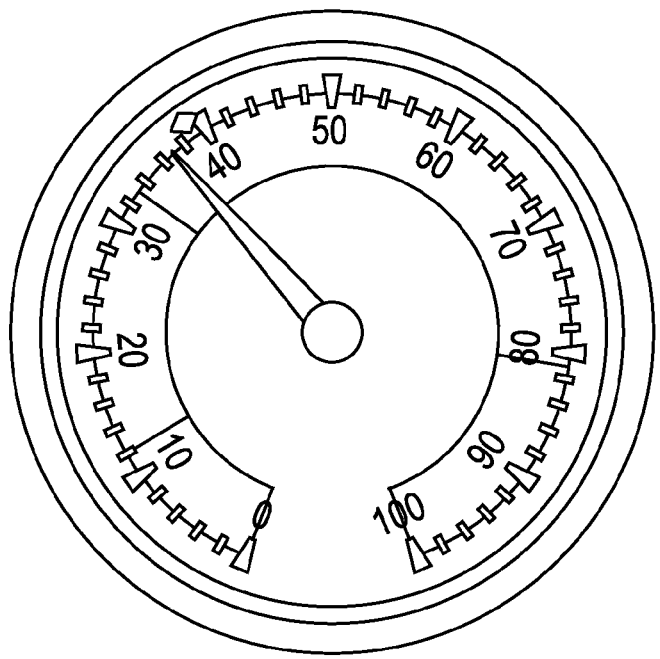
FIGS. 4A and 4B illustrate examples of graphical interfaces for indicating the driver's current skill level according to one embodiment.
Figure 4B:
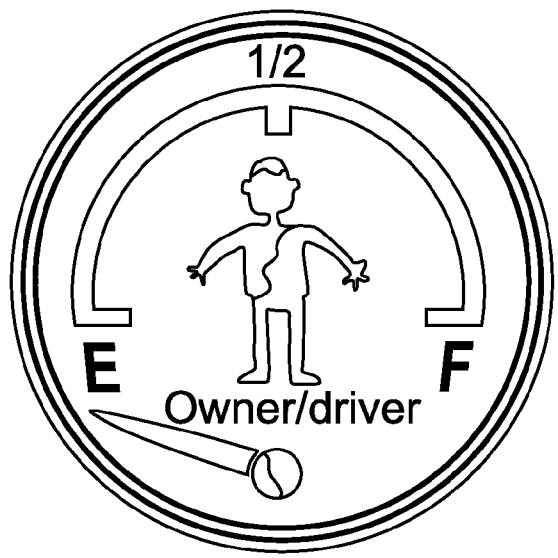

In another embodiment, the user interface module 208 displays an element, like the one illustrated in FIG. 4A, that informs the driver about the driver's current skill level. Referring to FIG. 4A, the needle in the graphical element points to a score associated with the driver's skill. As illustrated in FIG. 4A, the graphical element may include various colored zones to indicate different skill levels. In one embodiment, as illustrated in FIG. 4A, the skill level score of 0-10 is unacceptable and the zone for this score range is marked with a first color, and the skill level score of 11-30 is minimum required skilled and the zone for this score range is marked with a second color. The skill level score of 31-80 indicates varying degrees of acceptable skill level and this range is marked with a third color. The skill level score of 81-100 indicates exceptional skill level and this range is marked with a fourth color. Based on the driver's current skill level, the needle in the graphical element of FIG. 4A points to one of the ranges.

Figure 3:
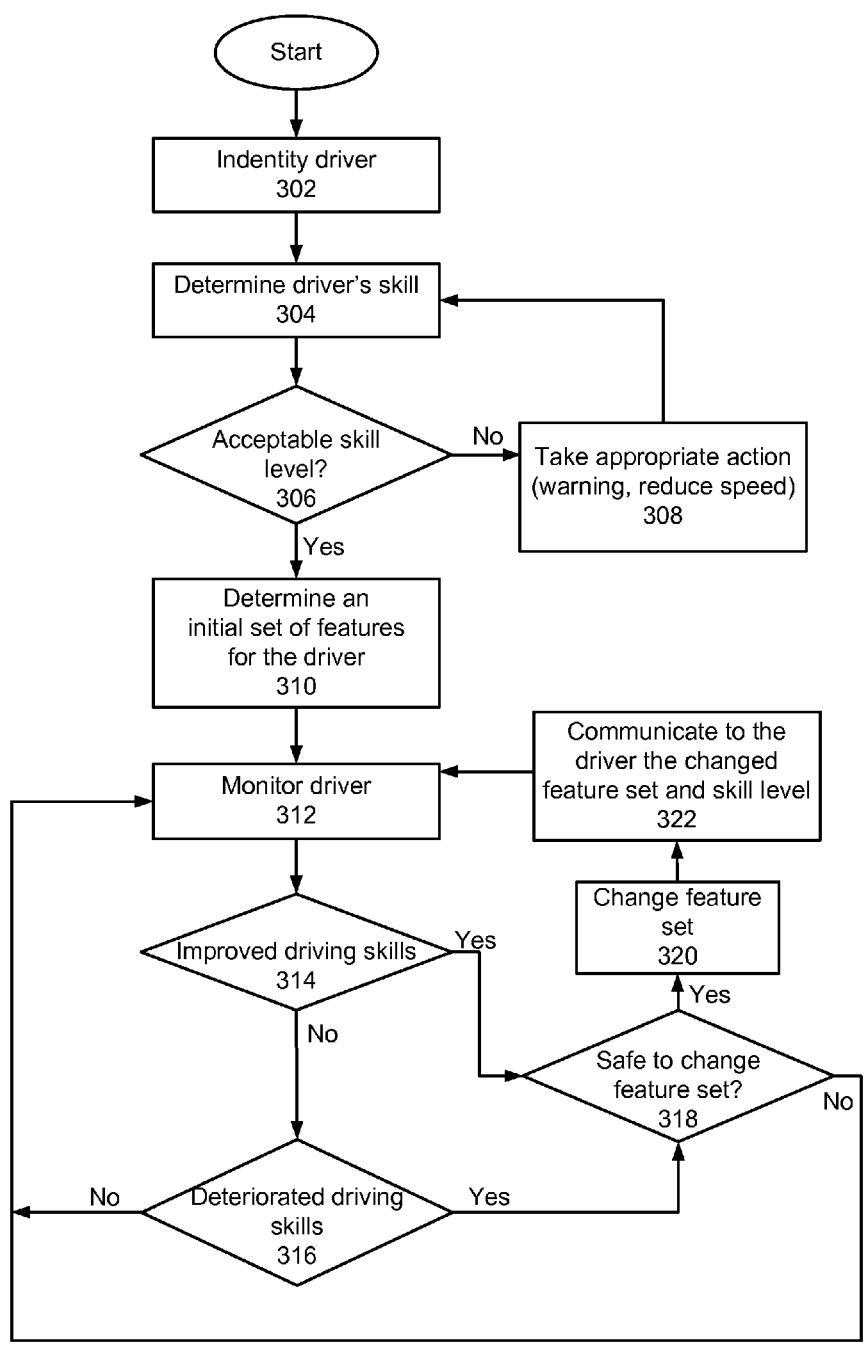
FIG. 3 is a flow diagram illustrating a method for preventing driving skill atrophy according to one embodiment.

Referring to FIG. 3, the communication module 210 establishes a communication link between the remote trainer module 108 and module 202-208 in trainer module 104. In one embodiment, the communications module implements a wireless protocol and exchanges messages with the remote trainer module 108 through this protocol. In another embodiment, the trainer module 104 and remote trainer module 108 are a combined physical entity. In this embodiment, the communication module 210 establishes communication link between the combined trainer module and external entities like external databases.

Driver Skill Prevention Methodology

FIG. 3 is a flow diagram illustrating a method for preventing driving skill atrophy according to one embodiment. The driver enters the vehicle 102 and the trainer module 104 identifies 302 the driver. Based on the identification, the trainer module 104 determines 304 an initial skill set for the driver. Next, the trainer module 104 determines 306 if the determined skill set is above an acceptable level. If not, the trainer module 104 takes 308 appropriate actions like communicating a warning to the driver or limiting the speed of vehicle 102 to a pre-determined threshold.

If the initial skill level is above an acceptable level, the trainer module 104 determines 310 an initial set of features based on the determined initial skill level. The trainer module 104 then enables the determined features and monitors 312 the driver as the driver operates the vehicle. As part of monitoring, the trainer module 104 records parameters associated with the driver. The trainer module 104 next analyzes 314 the recorded parameters to determine whether the driver's skill have improved from the initial skill level. If yes, the trainer module 104 determines an altered feature set based on the improved skill level and determines 318 if it's safe to change the enabled feature set for the driver. If not, the trainer module 104 does not change the feature set and repeats steps 312-318. Otherwise, the trainer module 104 changes 320 the enabled feature set to the altered set and communicates 322 the changed feature set and skill level to the driver. The trainer module 104 then repeats steps 312-322.

If the trainer module 104 determines at step 314 that the driver's skills have not improved, the trainer module 104 determines 316 if the driver's skills have deteriorated. If yes, the trainer module 104 implements steps 318-322 and then repeats steps 312-322. Otherwise, the trainer module repeats steps 312-322.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for preventing driving skill atrophy of a driver of a vehicle, the method comprising:
    enabling a first set of vehicle features;
    monitoring a change in a driving skill level of the driver of the vehicle;
    responsive to the monitored change comprising an increase in the driving skill level of the driver, enabling, by a processor, a second set of vehicle features that includes fewer features than the first set of vehicle features; and
    responsive to the monitored change comprising a decrease in the driving skill level of the driver, enabling, by the processor, a third set of vehicle features that includes more features than the first set of vehicle features.

2. The computer-implemented method of claim 1, further comprising:
    responsive to a determination that the monitored change does not exceed a threshold of change in the driving skill level of the driver, maintaining the enabled first set of vehicle features.

3. The computer-implemented method of claim 1, wherein the change in the driving skill level of the driver comprises a change in skill from previous operation of the vehicle by the driver.

4. The computer-implemented method of claim 1, wherein the driving skill level of the driver is represented by a set of scores, each score associated with one of a plurality of driving skill categories, and wherein one or more vehicle features are enabled responsive to a change in one or more scores in the set of scores.

5. The computer-implemented method of claim 1, wherein monitoring a change in the driving skill level of the driver of the vehicle is performed remotely from the vehicle.

6. The computer-implemented method of claim 1, wherein the second set of vehicle features or the third set of vehicle features is enabled only if the vehicle is moving slower than a threshold speed level.

7. A computer program product for preventing driving skill atrophy of a driver of a vehicle, the computer program product comprising a non-transitory computer-readable storage medium including computer program code for:
    enabling a first set of vehicle features;
    monitoring a change in a driving skill level of the driver of the vehicle;
    responsive to the monitored change comprising an increase in the driving skill level of the driver, enabling a second set of vehicle features that includes fewer features than the first set of vehicle features; and
    responsive to the monitored change comprising a decrease in the driving skill level of the driver, enabling a third set of vehicle features that includes more features than the first set of vehicle features.

8. The computer program product of claim 7, further comprising program code for:
    responsive to a determination that the monitored change does not exceed a threshold of change in the driving skill level of the driver, maintaining the enabled first set of vehicle features.

9. The computer program product of claim 7, wherein the change in the driving skill level of the driver comprises a change in skill from previous operation of the vehicle by the driver.

10. The computer program product of claim 7, wherein the driving skill level of the driver is represented by a set of scores, each score associated with one of a plurality of driving skill categories, and wherein one or more vehicle features are enabled responsive to a change in one or more scores in the set of scores.

11. The computer program product of claim 7, wherein monitoring a change in the driving skill level of the driver of the vehicle is performed remotely from the vehicle.

12. The computer program product of claim 7, wherein the second set of vehicle features or the third set of vehicle features is enabled only if the vehicle is moving slower than a threshold speed level.

13. A computer system for preventing driving skill atrophy of a driver of a vehicle, the computer system comprising a processor and a non-transitory computer readable medium, the computer readable medium including computer program code for:
    enabling a first set of vehicle features;
    monitoring a change in a driving skill level of the driver of the vehicle;
    responsive to the monitored change comprising an increase in the driving skill level of the driver, enabling a second set of vehicle features that includes fewer features than the first set of vehicle features; and
    responsive to the monitored change comprising a decrease in the driving skill level of the driver, enabling a third set of vehicle features that includes more features than the first set of vehicle features.

14. The computer system of claim 13, further comprising computer program code for:
  responsive to a determination that the monitored change does not exceed a threshold of change in the driving skill level of the driver, maintaining the enabled first set of vehicle features.

15. The computer system of claim 13, wherein the change in the driving skill level of the driver comprises a change in skill from previous operation of the vehicle by the driver.

16. The computer system of claim 13, wherein the driving skill level of the driver is represented by a set of scores, each score associated with one of a plurality of driving skill categories, and wherein one or more vehicle features are enabled responsive to a change in one or more scores in the set of scores.

17. The computer system of claim 13, wherein monitoring a change in the driving skill level of the driver of the vehicle is performed remotely from the vehicle.

18. The computer system of claim 13, wherein the second set of vehicle features or the third set of vehicle features is enabled only if the vehicle is moving slower than a threshold speed level.

19. A computer-implemented method for preventing driving skill atrophy of a driver of a vehicle, the method comprising:
  enabling a first set of vehicle features;
  monitoring a change in a driving skill level of the driver of the vehicle; and
  responsive to the monitored change comprising a decrease in the driving skill level of the driver, enabling, by a processor, a second set of vehicle features that includes more features than the first set of vehicle features.

* * * * *